(12) United States Patent
Lombardo et al.

(10) Patent No.: US 9,618,242 B2
(45) Date of Patent: Apr. 11, 2017

(54) METHOD FOR CONTROLLING A THERMAL STORAGE HEAT PUMP SYSTEM

(71) Applicant: GM GLOBAL TECHNOLOGY OPERATIONS LLC, Detroit, MI (US)

(72) Inventors: Paul S. Lombardo, Commerce Township, MI (US); Lawrence P. Ziehr, Clarkston, MI (US); Brian P. Lemon, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 503 days.

(21) Appl. No.: 13/742,735

(22) Filed: Jan. 16, 2013

(65) Prior Publication Data

US 2014/0196485 A1 Jul. 17, 2014

(51) Int. Cl.
*F25B 30/02* (2006.01)
*F25B 5/02* (2006.01)
(Continued)

(52) U.S. Cl.
CPC ......... *F25B 30/02* (2013.01); *B60H 1/00899* (2013.01); *F24H 4/06* (2013.01); *F24H 9/2064* (2013.01); *F25B 5/02* (2013.01); *F25B 6/02* (2013.01); *F25B 49/02* (2013.01); *B60H 2001/00928* (2013.01); *B60H 2001/00949* (2013.01); *F24D 2200/123* (2013.01); *F25B 7/00* (2013.01); *F25B 2313/004* (2013.01); *F25B 2500/26* (2013.01); *F25B 2700/02* (2013.01); *F25B 2700/1931* (2013.01); *F25B 2700/1933* (2013.01); *F25B 2700/2106* (2013.01); *Y02T 50/64* (2013.01)

(58) Field of Classification Search
CPC ....... Y02T 50/64; F25B 2313/004; F25B 7/00
USPC ............................ 62/244, 228.1; 165/104.21
See application file for complete search history.

(56) References Cited

U.S. PATENT DOCUMENTS 4,030,312 A * 6/1977 Wallin et al. ................ 62/235.1
5,362,201 A * 11/1994 Uhrner ................ F04D 29/0413
384/462
(Continued)

FOREIGN PATENT DOCUMENTS

| CN | 201081367 Y | 7/2008 |
|----|----|----|
| CN | 101943471 A | 1/2011 |
| CN | 102802976 A | 11/2012 |

*Primary Examiner* — Jianying Atkisson
*Assistant Examiner* — Joel Attey
(74) *Attorney, Agent, or Firm* — Quinn IP Law

(57) ABSTRACT

A thermal storage heat pump system transfers heat to a passenger compartment of a vehicle from at least one of a thermal storage device and ambient air. Heat from the thermal storage device is absorbed by a first coolant flowing through it, and is transferred to a refrigerant via a first heat exchanger. The heat is then transferred from the refrigerant to a second coolant via a second heat exchanger, and then from the second coolant to air flowing into the passenger compartment via a heater core. Heat from ambient air is absorbed by the refrigerant via a third heat exchanger. The heat source is determined by at least one of the thermal storage device temperature, ambient air temperature, and ambient air humidity. At start-up of the vehicle, heat transfer to the refrigerant and to the second coolant is controlled based on low-side and high-side pressure measurements of the refrigerant.

18 Claims, 2 Drawing Sheets

(51) Int. Cl.
*F25B 6/02* (2006.01)
*F25B 49/00* (2006.01)
*F24H 4/06* (2006.01)
*B60H 1/00* (2006.01)
*F25B 49/02* (2006.01)
*F24H 9/20* (2006.01)
F25B 7/00 (2006.01)

(56) References Cited

U.S. PATENT DOCUMENTS

| | | | |
|---|---|---|---|
| 5,549,153 A * | 8/1996 | Baruschke et al. | 165/42 |
| 5,553,662 A * | 9/1996 | Longardner et al. | 165/202 |
| 5,575,159 A * | 11/1996 | Dittell | F24F 5/0017 62/199 |
| 6,059,016 A * | 5/2000 | Rafalovich et al. | 165/41 |
| 6,112,543 A * | 9/2000 | Feuerecker et al. | 62/430 |
| 6,662,864 B2 * | 12/2003 | Burk | B60H 1/00921 165/202 |
| 6,966,197 B2 * | 11/2005 | Itoh et al. | 62/324.1 |
| 7,669,647 B2 * | 3/2010 | Tsubone et al. | 165/202 |
| 2001/0020529 A1 * | 9/2001 | Karl | 165/202 |
| 2003/0089121 A1 * | 5/2003 | Wilson | B01D 53/265 62/228.3 |
| 2008/0053114 A1 * | 3/2008 | Zhao | F25B 49/02 62/115 |
| 2008/0240953 A1 * | 10/2008 | Kimura | F04C 23/001 418/9 |
| 2010/0175413 A1 * | 7/2010 | Tsubone | 62/324.4 |

* cited by examiner

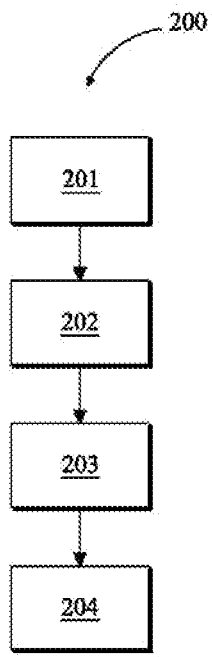
FIG. 2
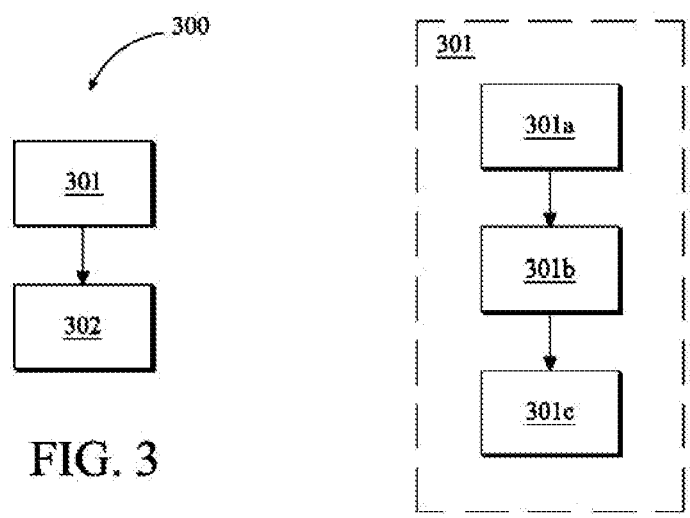
FIG. 3
FIG. 4

METHOD FOR CONTROLLING A THERMAL STORAGE HEAT PUMP SYSTEM

TECHNICAL FIELD

The present invention relates to a method for a thermal storage heat pump system for heating a passenger compartment of a vehicle, such as a hybrid electric vehicle (HEV) or a plug-in hybrid electric vehicle (PHEV).

BACKGROUND

An electric vehicle, such as a hybrid electric vehicle (HEV), a plug-in hybrid electric vehicle (PHEV), or the like, generally includes an electric motor, which may alone propel the vehicle in an electric vehicle (EV), or charge-depleting, drive mode. The vehicle may also include an internal combustion engine (ICE) to serve as the primary propulsion system of the vehicle in a range extending mode, or to operate in conjunction with the electric motor in a hybrid, or charge-sustaining, mode.

The electric motor generally receives electric power from an electric power source, such as an energy storage system (ESS). The ESS may include a battery pack or other rechargeable energy storage means capable of storing large amounts of thermal energy. The ESS may store the thermal energy when the vehicle is connected to an external power source, such as an electrical grid, for charging. In colder ambient temperatures, the charge of the ESS depletes faster, due to various factors.

The ESS may be used in conjunction with a thermal management system, such as a heat pump system, to transfer the stored thermal energy to another medium for another purpose, such as to heat a passenger compartment of the vehicle.

SUMMARY

A thermal storage heat pump system in a vehicle having a passenger compartment is provided. The thermal storage heat pump system includes a first coolant circuit, a second coolant circuit, and a refrigerant circuit in thermal communication with the first coolant circuit and the second coolant circuit via a first heat exchanger and a second heat exchanger, respectively. The first coolant circuit has a first coolant pump configured to circulate a first coolant through the first coolant circuit such that heat may be transferred from the first coolant to the refrigerant. The second coolant circuit has a second coolant pump configured to circulate a second coolant through the second coolant circuit such that heat may be transferred from the refrigerant to the second coolant.

The thermal storage heat pump system also includes a thermal storage device, a heater core, a compressor, a third heat exchanger, and a plurality of flow control valves. The thermal storage device is located in the first coolant circuit, and is configured to store thermal energy. The heater core is located in the second coolant circuit and is configured to transfer heat from the second coolant to air flowing across the heater core to warm up the passenger compartment of the vehicle. The compressor is located in the refrigeration circuit, and has an inlet and an outlet. The compressor is configured to compress the refrigerant from a low-side pressure at the inlet to a high-side pressure at the outlet. The third heat exchanger is also located in the refrigeration circuit and is configured to transfer heat from ambient air to the refrigerant. The flow control valves are located in the refrigeration circuit and are configured to control the flow of refrigerant in the refrigeration circuit.

The thermal storage heat pump system further includes at least one controller. The at least one controller is configured to control the operation of at least the first coolant pump, the second coolant pump, the compressor, the heater, and the plurality of flow control valves based on at least one parameter. The at least one parameter may be at least one of the low-side pressure of the refrigerant, the high-side pressure of the refrigerant, desired temperature of the passenger compartment, the temperature of the thermal storage device, the ambient air temperature, and the ambient air humidity.

The thermal storage heat pump system further may include a first temperature sensor, a second temperature sensor, a humidity sensor, a low-side pressure sensor, a high-side pressure sensor, and an input module. The first temperature sensor and the second temperature sensor may be configured to measure the temperature of the thermal storage device and the ambient air, respectively. The humidity sensor may be configured to measure the ambient air humidity. The low-side pressure sensor and the high-side pressure sensor may be configured to measure the low-side pressure and the high-side pressure, respectively, of the refrigerant. The input module may be configured to receive an input of the desired passenger compartment temperature. Each device may further be configured to transmit data to the at least one controller.

A method for controlling the thermal storage heat pump system described above during start-up of the vehicle is also provided. The method includes first receiving a low-side pressure measurement and a high-side pressure measurement of the refrigerant at the inlet and outlet, respectively, of the compressor. As explained above, the low-side and high-side pressure measurements may be taken and transmitted to the at least one controller, by the low-side pressure sensor and the high-side pressure sensor, respectively.

The method then includes comparing the low-side pressure measurement to a minimum low-side pressure value, and the high-side pressure measurement to a maximum high-side pressure value, to obtain at least one condition, and operating at least one of the compressor, the first coolant pump, and the second coolant pump accordingly. The minimum low-side pressure value and the maximum high-side pressure value are stored in the at least one controller.

When the at least one condition is that the low-side pressure measurement is below the minimum low-side pressure value, the at least one controller may set the first coolant pump at a maximum speed, and the compressor to a minimum speed.

When the at least one condition is that the low-side pressure measurement is above the minimum low-side pressure value, and the high-side pressure measurement is below the maximum high-side pressure value, the at least one controller may maintain the first coolant pump at the maximum speed, increase the speed of the compressor to a maximum speed, and set the second coolant pump at a minimum speed. The controller may increase the speed of the second coolant pump according to the desired passenger compartment temperature input received from the input module.

A method for controlling the thermal storage heat pump system described above when it is in a steady state is further provided. The method includes first receiving at least one measurement of a parameter. The parameter may be at least one of the thermal storage device temperature, the ambient air temperature, and the ambient air humidity. The method then includes determining a heat source from which the second coolant receives heat to be transferred to the passenger compartment via the heater core based on the at least one measurement, and operating the thermal storage heat pump system accordingly to draw heat from that heat source. The heat source is at least one of the thermal storage device and ambient air via the third heat exchanger, as explained above.

Also as explained above, the thermal storage device temperature measurement, the ambient air temperature measurement, and the ambient air humidity measurement may be taken and transmitted to the at least one controller by a first temperature sensor, a second temperature sensor, and a humidity sensor, respectively.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 2 is a schematic flow diagram of a method for operating the thermal storage heat pump system of FIG. 1 during start-up of the vehicle;

FIG. 3 is a schematic flow diagram of a method for operating the thermal storage heat pump system of FIG. 1 when the system is in a steady state; and FIG. 4 is a schematic flow diagram illustrating a step of the method of FIG. 3.

DETAILED DESCRIPTION

Figure 1:
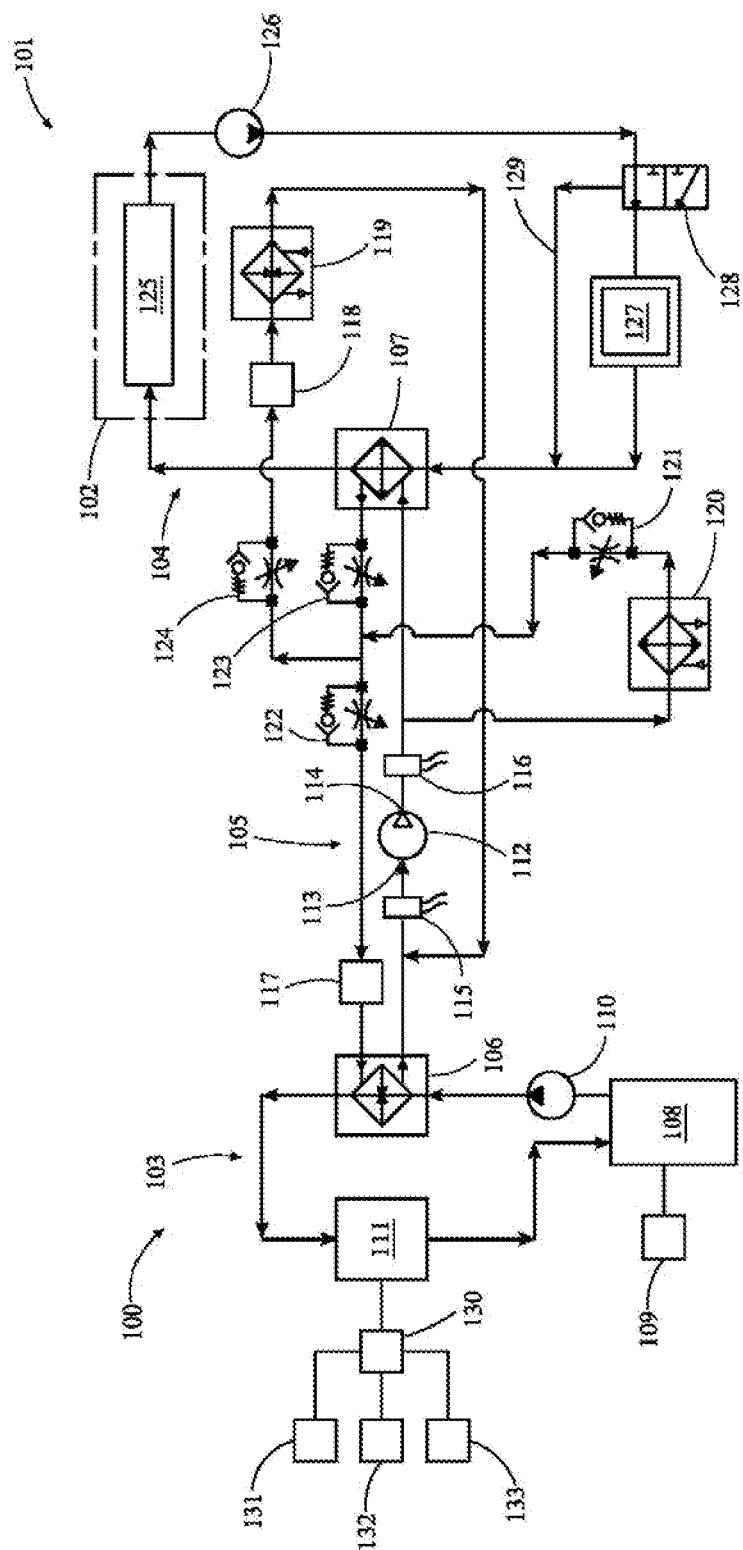
FIG. 1 is a schematic diagram of a thermal storage heat pump system of a vehicle.

The following description and figures refer to example embodiments and are merely illustrative in nature and not intended to limit the invention, its application, or uses. Throughout the figures, some components are illustrated with standardized or basic symbols. These symbols are representative and illustrative only, and are in no way limiting to any specific configuration shown, to combinations between the different configurations shown, or to the claims. All descriptions of componentry are open-ended and any examples of components are non-exhaustive.

Referring to the drawings, wherein like reference numbers correspond to like or similar components wherever possible throughout the several figures, a thermal storage heat pump system 100 for use in a vehicle 101, including, but not limited to, a hybrid electric vehicle (HEV), a plug-in hybrid electric vehicle (PHEV), or the like, is shown in FIG. 1. The vehicle 101 generally has an inactive charging state, in which a thermal storage device 108, described hereinafter, is charged, and an active drive state. In the active drive state, the vehicle 101 may selectively operate in a range extending mode, a hybrid, or charge-sustaining, mode, and an electric vehicle (EV), or charge-depleting, drive mode. In range extending mode, an internal combustion engine (ICE) 127, described hereinafter, operates as the sole propulsion system for the vehicle 101. In hybrid mode, the vehicle 101 operates using both electric power from an electric motor (not shown) and power from the ICE 127. In EV drive mode, the vehicle 101 operates solely on electricity.

The thermal storage heat pump system 100 generally includes a first coolant circuit 103, a second coolant 104, and a refrigeration circuit 105 that are configured to circulate a first coolant, a second coolant, and a refrigerant, respectively. The refrigeration circuit 105 is in thermal communication with the first coolant circuit 103 and the second coolant circuit 104 via a first heat exchanger 106 and a second heat exchanger 107, respectively. The first heat exchanger 106 may be a refrigerant-to-liquid chiller heat exchanger that may function as a heat pump evaporator to dissipate heat from the first coolant in the first coolant circuit 103 to the refrigerant in the refrigeration circuit 105. The second heat exchanger 107 may also be a refrigerant-to-liquid heat exchanger that may function as a heat pump condenser to dissipate heat from the refrigerant in the refrigeration circuit 105 to the second coolant in the second coolant circuit 104.

The first coolant circuit 103 includes a thermal storage device 108, a first coolant pump 110, and a heater 111. The thermal storage device 108 may be any medium, device, machine, or the like, capable of generating and storing thermal energy. For example, the thermal storage device 108 may be an energy storage system (ESS) that includes at least one battery or battery pack. The thermal storage device 108 may include a first temperature sensor 109 configured to measure the temperature of the thermal storage device 108 to obtain a thermal storage device temperature measurement. The first temperature sensor 109 further may be configured to transmit the thermal storage device temperature measurement to a controller 130, described hereinafter.

The heater 111 may be configured to heat the first coolant in the first coolant circuit 103, which flows to the thermal storage device 108 where the heat may be deposited and stored. The heater 111 may be, but is not limited to, a resistive heater.

The first coolant pump 110 may be configured to circulate the first coolant through the heater 111 and the thermal storage device 108 such that the first coolant may absorb heat generated by the thermal storage device 108, or deposit heat within the thermal storage device 108. The first coolant pump 110 further may be configured to circulate the first coolant through the first heat exchanger 106 such that heat may be transferred from the first coolant to the refrigerant, as explained above. The first coolant pump 110 may be variable speed. While the first coolant pump 110 is shown downstream of the thermal storage device 108, it should be appreciated that it may be located upstream of the thermal storage device 108.

The refrigeration circuit 105 includes a compressor 112 having an inlet 113 and an outlet 114. The compressor 112 is located downstream of the first heat exchanger 106 and upstream of the second heat exchanger 107. The compressor 112 may be configured to compress the refrigerant from a low-side pressure at the inlet 113 to a high-side pressure at the outlet 114 of the compressor 112.

The refrigeration circuit 105 also may include a low-side pressure sensor 115 and a high-side pressure sensor 116 located at the inlet 113 and the outlet 114, respectively, of the compressor 112. The low-side pressure sensor 115 may be configured to measure the pressure of the refrigerant before entering the compressor 112, and the high-side pressure sensor 116 may be configured to measure the pressure of the refrigerant after exiting the compressor 112. The low-side pressure sensor 115 and the high-side pressure sensor 116 further may be configured to transmit the pressure measurements to the controller 130.

The refrigeration circuit 105 also includes a first thermal expansion device 117, a second thermal expansion device 118, and a third heat exchanger 119. The third heat exchanger 119 may be an ambient-to-refrigerant heat exchanger that may function as a cabin evaporator. It may be configured to absorb heat from the air flowing across it, to cool and dehumidify the passenger compartment 102, and to transfer the heat to the refrigerant flowing through it. The refrigerant may then be distributed to the compressor 112 and subsequently to the second heat exchanger 107, where the heat in the refrigerant may be absorbed by the second coolant, as explained above.

The first thermal expansion device 117 and the second thermal expansion device 118 may be located downstream of the second heat exchanger 107, and may be configured to cool and expand the refrigerant to be distributed to the first heat exchanger 106 and to the third heat exchanger 119, respectively. The first thermal expansion device 117 and the second thermal expansion device 118 may be thermostatic or thermal expansion valves, and may be either electronically or mechanically actuated.

The refrigeration circuit 105 may also include a fourth heat exchanger 120. The fourth heat exchanger 120 may be a refrigerant-to-ambient heat exchanger, and may function as a condenser for an air conditioning (A/C) system (not shown) of the vehicle 101.

The refrigeration circuit 105 may further include a plurality of flow control valves 121, 122, 123, and 124. The flow control valves 121, 122, 123, and 124 may be configured to control the flow to the various components in the refrigeration circuit 105. It should be appreciated that the flow control valves 121, 122, 123, and 124 may be any valve capable of restricting the flow of refrigerant in a particular line, and may be, but are not limited to, two-position, open/closed valves, or alternatively, modulating valves.

The second coolant circuit 104 includes a heater core 125 and a second coolant pump 126. The second coolant pump 126, which may be variable speed, may be configured to circulate the second coolant through the heater core 125. The heater core 125, in turn, may be configured to receive the second coolant to heat air flowing across it and into the passenger compartment 102. As explained above, the second coolant may receive heat from the thermal storage device 108 via the first heat exchanger 106, and/or from the ambient air via the third heat exchanger 119. While the second coolant pump 126 is shown downstream of the heater core 125, it should be appreciated that it may be located upstream of the heater core 125.

The second coolant circuit 104 also may include the ICE 127, mentioned above. The ICE 127 may have heat within it from having been in operation. The heat may be deposited in the second coolant as it flows through the ICE 127, thereby cooling the ICE 127.

The second coolant circuit 104 further may include a bypass valve 128 and a bypass line 129. The bypass valve 128 is configured to selectively direct the second coolant to the ICE 127 to cool it when the vehicle 101 is in range extending mode or hybrid mode, or to the bypass line 129 when the vehicle 101 is in EV drive mode. While the bypass valve 128 is shown in FIG. 1 as a two-position three-way valve, it should be appreciated that the bypass valve 128 may be any three-way valve configured to selectively direct the flow to the ICE 127 and/or to the bypass line 129. In an alternative embodiment not shown, in lieu of a three-way valve, there may be two separate flow control valves, one each on the bypass line 129 and the second coolant circuit 104 downstream of the takeoff for the bypass line 129.

The thermal storage heat pump system 100 may also include at least one controller 130 to control the operation of the thermal storage heat pump system 100. In particular, the controller 130 may control the operation of various devices of the thermal storage heat pump system 100 based on certain parameters, including, but not limited to, humidity, ambient air temperature, temperature of the thermal storage device 108, low-side and high-side pressure of the refrigerant, desired temperature of the passenger compartment 102, and the like, as depicted in FIGS. 2-4 and described in methods 200 and 300 hereinafter.

The controller 130 may be electrically connected to the thermal storage heat pump system 100 via at least one electrical connection. The controller 130 may be configured to communicate with the various devices, including the heater 111, the first coolant pump 110, the second coolant pump 126, the compressor 112, the first and second thermal expansion devices 117 and 118, and the flow control valves 121, 122, 123, and 124. The controller 130 also may be configured to communicate with and receive information from other ancillary devices, including, but not limited to, the low-side and high-side pressure sensors 115 and 116 described above, the first temperature sensor 109 also described above, a second temperature sensor 131, a humidity sensor 132, and an input module 133, describer hereinafter. The controller 130 may process the information received from these ancillary devices to determine which of the devices of the thermal storage heat pump system 100 should be operating and at what speed or position given a particular condition, and to control those devices accordingly. The controller 130 may further be configured to control any other devices in the thermal storage heat pump system 100, as well as any other subsystems in the vehicle 101.

The second temperature sensor 131 generally is any device configured to measure the ambient air temperature. Similarly, the humidity sensor 132 is any device configured to measure the humidity of the ambient air. The second temperature sensor 131 and the humidity sensor 132 further may be configured to transmit data, such as the ambient air temperature measurement and the humidity measurement, respectively, to the controller 130 to be stored and/or processed. The second temperature sensor 131 and the humidity sensor 132 may be external to the controller 130, as depicted in FIG. 1, and may transmit the data through a wired or wireless connection. In another embodiment not shown, the second temperature sensor 131 and the humidity sensor 132 may be internal to the controller 130. In yet another embodiment not shown, the controller 130 may be configured to obtain such data as the ambient air temperature and humidity from a remote source (not shown) via the internet or other communications network.

The input module 133 may be any device configured to receive an input, such as a desired temperature or heat supply for the passenger compartment 102, or other data from a user of the thermal storage heat pump system 100. The input module 133 further may be configured to transmit such data to the controller 130. The input module 133 may be, but is not limited to, a mobile phone, an onboard computer in the vehicle 101, and the like.

Referring to FIG. 2, a method 200 for controlling the thermal storage heat pump system 100 is shown. In particular, method 200 is a method for operating the various devices of the thermal storage heat pump system 100 during start-up of the vehicle 101 and the thermal storage heat pump system 100. Such devices may include, but are not limited to, the first coolant pump 110, the second coolant pump 126, and the compressor 112.

Method 200 begins at step 201, in which the controller 130 receives a low-side pressure measurement. As explained above, the low-side pressure measurement may be taken and transmitted to the controller 130 by the low-side pressure sensor 115.

After step 201, method 200 proceeds to step 202. At step 202, the controller 130 receives a high-side pressure measurement. As explained above, the high-side pressure measurement may be taken and transmitted to the controller 130 by the high-side pressure sensor 116.

After step 202, method 200 proceeds to step 203. At step 203, the controller 130 compares the low-side pressure measurement to a minimum low-side pressure value, and the high-side pressure measurement to a maximum high-side pressure value to determine a condition, e.g., the low-side pressure measurement is less than the minimum low-side pressure value. In one embodiment, the minimum low-side pressure value may be 100 kPa, and the maximum high-side pressure value may be 1800 kPa. The minimum low-side pressure value and the maximum high-side pressure value may be stored in the controller 130, and also may be adjustable.

After step 203, method 200 proceeds to step 204. At step 204, the controller 130 operates at least one of the first coolant pump 110, the second coolant pump 126, and the compressor 112 based on the condition determined in step 203. The relationship of the different conditions and the associated operation of the first coolant pump 110, the second coolant pump 125, and the compressor 112, as described hereinafter, may be stored in the controller 130 such that when it receives the condition, it may operate the devices accordingly.

When the low-side pressure measurement is lower than the minimum low-side pressure value, the controller 130 sets the first coolant pump 110 to operate at a maximum speed, and the compressor 112 to operate at a minimum speed. This may allow as much thermal energy as possible to be transferred from the first coolant, via the thermal storage device 108, to the refrigerant. This generally may occur when the vehicle 101 and the thermal storage heat pump system 100 are just starting up.

When the low-side pressure measurement is higher than the minimum low-side pressure value, and the high-side pressure measurement is lower than the maximum high-side pressure value, the controller 130 ramps up the speed of the compressor to a maximum speed. The controller 130 further sets the second coolant pump 126 to operate at a minimum speed. The controller 130 maintains the first coolant pump 110 at the maximum speed.

Method 200 may further include receiving from an input module 133 a desired temperature, or amount of heat, for the passenger compartment 102. The controller 130 then ramps the speed of the second coolant pump 126 such that the proper amount of heat may be transferred to the second coolant via the second heat exchanger 107 to provide the desired amount of heat to the passenger compartment 102 via the heater core 125.

The source of heat, i.e., from the thermal storage device 108 and/or from the ambient air via the third heat exchanger 119 is determined by the controller 130 according to method 300, depicted in FIG. 3 and described hereinafter.

Referring to FIG. 3, a method 300 for controlling the thermal storage heat pump system 100 is shown. In particular, method 300 is a method for determining the source of heat to heat the passenger compartment 102 when the vehicle is in an active drive state and the thermal storage heat pump system 100 is in a steady state, and operating the various devices of the thermal storage heat pump system 100 accordingly. The devices may include, but are not limited to, the heater 111, the first coolant pump 110, the second coolant pump 126, the compressor 112, and the flow control valves 121, 122, 123, and 124.

Method 300 begins at step 301 in which the controller 130 receives a measurement of a parameter. As explained above, the parameter may be at least one of the temperature of the thermal storage device 108, the ambient air temperature, and the ambient air humidity. Step 301 may include sub-steps 301a-c, as depicted in FIG. 4.

Referring to FIG. 4, at step 301a, the controller 130 receives a temperature measurement of the thermal storage device 108. As explained above, the temperature of the thermal storage device 108 may be measured by the first temperature sensor 109, which may then transmit the resultant thermal storage device temperature measurement to the controller 130.

At step 301b, the controller 130 receives an ambient air temperature measurement. As explained above, the ambient air temperature may be measured by the second temperature sensor 131, which may then transmit the resultant ambient air temperature measurement to the controller 130.

At step 301c, the controller 130 receives a humidity measurement of the ambient air. As explained above, the ambient air humidity may be measured by the humidity sensor 132, which may then transmit the resultant humidity measurement to the controller 130.

It should be appreciated that steps 301a-c may be performed in any order. It should further be appreciated that method 300 may include other parameters in addition to the temperature of the thermal storage device 108, the ambient air temperature, and the ambient air humidity.

Referring back to FIG. 3, method 300 proceeds to step 302 after step 301. At step 302, the controller 130 operates the devices of the thermal storage heat pump system 100 based on a relationship between at least one of the temperature of the thermal storage device 108, the ambient air temperature, and the ambient humidity with the operation of the devices. The relationships, described hereinafter, may be stored in the controller 130 such that when it receives the measurements of the parameters, it can operate the devices accordingly.

Generally, at colder ambient air temperatures, the thermal storage heat pump system 100 may utilize heat stored within the thermal storage device 108, in lieu of heat extracted from the ambient air via the third heat exchanger 119, to heat the passenger compartment 102, as explained above. This is because the ambient air may be too cold to provide sufficient heat to heat the passenger compartment 102. In such a situation, the first coolant pump 110, the compressor 112, and the second coolant pump 126 operate to transfer the heat stored within the thermal storage device 108 to the passenger compartment 102 via the heater core 125.

However, as ambient air temperature increases, and it is still desired to heat the passenger compartment 102, there may be sufficient heat in the ambient air to heat the passenger compartment 102 such that the heat stored in the thermal storage device 108 may be unnecessary to utilize. In addition, as the ambient air humidity also increases, there may be more of a need to exchange heat with the ambient air via the third heat exchanger 119 to dehumidify the air. In such situations, the flow control valves 123 and 124 operate to direct the flow through the third heat exchanger 119 to absorb the heat from the ambient air. The compressor 112 and the second coolant pump 126 operate to transfer the heat to the second coolant via the second heat exchanger 107, and ultimately to the passenger compartment 102 via the heater core 125.

Similarly, as the temperature of the thermal storage device 108 increases, more heat is available to be utilized to heat the passenger compartment 102. However, as the temperature of the thermal storage device 108 decreases, it may become necessary to operate the heater 111 to provide additional heat to be stored in the thermal storage device 108, and subsequently transferred to the passenger compartment 102. For example, this may arise when the temperature of the thermal storage device is 10 degrees C. and below. In some situations in which the ambient air is above a certain temperature, the heater may not need to be run despite the colder temperature of the thermal storage device 108. For example, this may arise when the temperature of the thermal storage device is 10 degrees C. and the ambient air temperature is 10 degrees C. or above.

Situations may arise in which heat may be drawn from both the thermal storage device 108 and the ambient air. For example, this may arise when the temperature of the thermal storage device 108 is 10 degrees C., the ambient air temperature is 10 degrees C., and the ambient air humidity is between 50% and 90%.

The combination of the parameters (i.e., ambient air temperature, ambient air humidity, and temperature of the thermal storage device 108) dictate whether the thermal storage heat pump system 100 may utilize heat from the ambient air, heat stored within the thermal storage device 108, or heat from both sources to heat the passenger compartment 102. The controller 130 has stored in it from which source the thermal storage heat pump system 100 should draw heat when the parameters are at certain conditions. As such, when the controller 130 receives the first temperature measurement, the second temperature measurement, and the humidity measurement, it may determine from which source the thermal storage heat pump system 100 should draw heat, and operate the devices in the thermal storage heat pump system 100 accordingly.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A thermal storage heat pump system of a vehicle having a passenger compartment and a discrete internal combustion engine, the system comprising:
    a first coolant circuit having a first coolant pump configured to circulate a first coolant through the first coolant circuit;
    a second coolant circuit having a second coolant pump configured to circulate a second coolant through the second coolant circuit, wherein the second coolant circuit includes the internal combustion engine, and the second coolant pump is discrete and separate from the internal combustion engine;
    a refrigeration circuit configured to circulate a refrigerant, the refrigeration circuit being in thermal communication with the first coolant circuit and the second coolant circuit via a first heat exchanger and a second heat exchanger, respectively;
    a thermal storage device located in the first coolant circuit, wherein the thermal storage device is configured to store thermal energy, and the thermal storage device is an energy storage system that includes at least one battery pack;
    a heater located in the first coolant circuit, wherein the first heat exchanger is upstream of the thermal storage device such that the heater is configured to heat the first coolant before the first coolant reaches the thermal storage device;
    a heater core located on the second coolant circuit, the heater core being configured to transfer heat from the second coolant to air flowing across the heater core to warm up the passenger compartment;
    a compressor having an inlet and an outlet, the compressor being located on the refrigeration circuit and being configured to compress the refrigerant from a low-side pressure to a high-side pressure;
    a third heat exchanger configured to transfer thermal energy from ambient air to the refrigerant;
    a plurality of flow control valves in the refrigeration circuit, the flow control valves being configured to control the flow of refrigerant in the refrigeration circuit; and
    at least one controller configured to control the operation of at least one of the first coolant pump, the second coolant pump, the compressor, and the plurality of flow control valves based on at least one parameter.

2. The thermal storage heat pump system of claim 1, wherein the heater is a resistive heater.

3. The thermal storage heat pump system of claim 1 wherein the at least one parameter comprises at least one of ambient air temperature, ambient air humidity, temperature of the thermal storage device, low-side and high-side pressure of the refrigerant, and desired temperature of the passenger compartment, and the second coolant circuit further includes a bypass line and a bypass valve, the bypass line bypasses the internal combustion engine, the bypass valve is downstream of the second coolant pump and upstream of the internal combustion engine, the bypass valve is configured to selectively direct the second coolant to the internal combustion engine when the vehicle is in one of a range extending mode or a hybrid mode, and the bypass valve is configured to selectively direct the second coolant to the bypass line when the vehicle is in an electric vehicle (EV) drive mode such that the second coolant bypasses the internal combustion engine when the vehicle is in the EV drive mode.

4. The thermal storage heat pump system of claim 3 wherein the thermal storage device comprises a first temperature sensor configured to measure the temperature of the thermal storage device to obtain a thermal storage device temperature measurement, and to transmit the thermal storage device temperature measurement to the at least one controller, the refrigeration circuit includes a first thermal expansion device configured to cool and expand the refrigerant to be distributed to the first heat exchanger, and the first thermal expansion device is located downstream of the second heat exchanger and upstream of the first heat exchanger.

5. The thermal storage heat pump system of claim 4 further comprising a second temperature sensor configured to measure the ambient air temperature to obtain an ambient air temperature measurement, and to transmit the ambient air temperature measurement to the at least one controller, the refrigeration circuit includes a second thermal expansion device configured to cool and expand the refrigerant to be distributed to the third heat exchanger, the second thermal expansion device is located upstream of the third heat exchanger, and the first thermal expansion device and the second thermal expansion device are thermal expansion valves.

6. The thermal storage heat pump system of claim 3 further comprising a humidity sensor to measure the ambient air humidity to obtain a humidity measurement, and to transmit the humidity measurement to the at least one controller, and the third heat exchanger is fluidly connected in parallel with respect to the second heat exchanger.

7. The thermal storage heat pump system of claim 6 further comprising a low-side pressure sensor configured to measure a low-side pressure of the refrigerant at the inlet of the compressor to obtain a low-side pressure measurement, and to transmit the low-side pressure measurement to the at least one controller, and the refrigeration circuit includes a fourth heat exchanger, the fourth heat exchanger is fluidly connected in parallel with the compressor, the fourth heat exchanger is a refrigerant-to-ambient air heat exchanger and functions as a condenser, the plurality of flow control valves includes a first flow control valve fluidly connected in series with the fourth heat exchanger, the first flow control valve is fluidly connected in parallel with the compressor, and the first flow control valve is downstream of the fourth heat exchanger.

8. The thermal storage heat pump system of claim 7 further comprising a high-side pressure sensor configured to measure a high-side pressure of the refrigerant at the outlet of the compressor to obtain a high-side pressure measurement, and to transmit the high-side pressure measurement to the at least one controller, wherein the compressor is located downstream of the first heat exchanger and upstream of the second heat exchanger such that the refrigerant flows through the first heat exchanger, then through the compressor, and then through the second heat exchanger.

9. The thermal storage heat pump system of claim 8 further comprising an input module configured to receive and transmit to the at least one controller a desired passenger compartment temperature input, the refrigeration circuit includes a first thermal expansion device configured to cool and expand the refrigerant to be distributed to the second heat exchanger, the first thermal expansion device is upstream of the first heat exchanger and downstream of the second heat exchanger, the first thermal expansion device is fluidly connected in series with the first heat exchanger, the plurality of flow control valves includes a second flow control valve and a third flow control valve, the second flow control valve is downstream of the second heat exchanger and upstream of the first thermal expansion device, and the second flow control valve is fluidly connected in series with the first thermal expansion device.

10. The thermal storage heat pump system of claim 9, wherein the refrigeration circuit includes a second thermal expansion device configured to cool and expand the refrigerant to be distributed to the third heat exchanger, the second thermal expansion device is fluidly connected in series with the third heat exchanger, the second thermal expansion device is upstream of the third heat exchanger, and the third flow control valve is fluidly connected in series with the second heat exchanger, the third flow control valve is downstream of the second heat exchanger, and the at least one controller is programmed to:
receive the low-side pressure measurement of the refrigerant at the inlet of the compressor;
compare the low-side pressure measurement to a minimum low-side pressure value to determine if the low-side pressure measurement is less than the minimum low-side pressure value; and
command the first coolant pump to operate at a maximum speed thereof when the low-side pressure measurement is less than the minimum low-side pressure value.

11. The thermal storage heat pump system of claim 10, wherein the at least one controller is programmed to command the compressor to operate at a minimum speed thereof when the low-side pressure measurement is less than the minimum low-side pressure value, the plurality of flow control valves includes a fourth flow control valve, the fourth flow control valve is fluidly connected in series with the third heat exchanger and the second thermal expansion device, the fourth flow control valve is upstream of the second thermal expansion device, and the fourth flow control valve is fluidly connected in parallel with the third flow control valve.

12. The thermal storage heat pump system of claim 11, wherein the second coolant pump is downstream of the heater core, and the at least one controller is programmed to:
receive the high-side pressure measurement of the refrigerant at the outlet of the compressor;
compare the high-side pressure measurement to a maximum high-side pressure value to determine if the high-side pressure measurement is lower than the maximum high-side pressure value; and
command the compressor to operate at a maximum speed thereof when the high-side pressure measurement is lower than the maximum high-side pressure value.

13. The thermal storage heat pump system of claim 12, wherein the second heat exchanger is downstream of the internal combustion engine and upstream of the heater core, and the at least one controller is programmed to command the second coolant pump to operate at a minimum speed thereof when the high-side pressure measurement is lower than the maximum high-side pressure value.

14. A thermal storage heat pump system of a vehicle having a passenger compartment, the system comprising:
a first coolant circuit having a first coolant pump configured to circulate a first coolant;
a second coolant circuit having a second coolant pump configured to circulate a second coolant;
a refrigeration circuit configured to circulate a refrigerant, the refrigeration circuit being in thermal communication with the first coolant circuit and the second coolant circuit via a first heat exchanger and a second heat exchanger, respectively;
a thermal storage device located in the first coolant circuit, wherein the thermal storage device is configured to store thermal energy, and the thermal storage device is an energy storage system that includes at least one battery pack;
a resistive heater located in the first coolant circuit, wherein the resistive heater is upstream of the thermal storage device such that the resistive heater is configured to heat the first coolant before the first coolant reaches the thermal storage device;
a heater core located on the second coolant circuit, the heater core being configured to transfer heat from the second coolant to air flowing across the heater core to warm up the passenger compartment;
a compressor having an inlet and an outlet, the compressor being located on the refrigeration circuit and being configured to compress the refrigerant from a low-side pressure to a high-side pressure;
a third heat exchanger configured to transfer thermal energy from ambient air to the refrigerant;
a plurality of flow control valves in the refrigeration circuit, the flow control valves being configured to control the flow of refrigerant in the refrigeration circuit;

a low-side pressure sensor configured to measure a low-side pressure of the refrigerant at the inlet of the compressor to obtain a low-side pressure measurement;

at least one controller programmed to control the operation of at least one of the first coolant pump, the second coolant pump, the compressor, and the plurality of flow control valves based on at least one parameter, wherein the at least one controller is programmed to:

receive the low-side pressure measurement from the low-side pressure sensor;

compare the low-side pressure measurement to a minimum low-side pressure value to determine if the low-side pressure measurement is less than the minimum low-side pressure value;

command the first coolant pump to operate at a maximum speed thereof when the low-side pressure measurement is less than the minimum low-side pressure value; and command the compressor to operate at a minimum speed thereof when the low-side pressure measurement is less than the minimum low-side pressure value.

15. The thermal storage heat pump system of claim 14, wherein the at least one controller is programmed to command the compressor to operate at the minimum speed thereof and the first coolant pump to operate at the maximum speed thereof when the thermal storage heat pump system is starting up, and the refrigeration circuit includes a fourth heat exchanger, the fourth heat exchanger is fluidly connected in parallel with the compressor, the fourth heat exchanger is a refrigerant-to-ambient air heat exchanger and functions as a condenser.

16. The thermal storage heat pump system of claim 15, further comprising a high-side pressure sensor configured to measure a high-side pressure of the refrigerant at the outlet of the compressor to obtain a high-side pressure measurement, and to transmit the high-side pressure measurement to the at least one controller, the plurality of flow control valves includes a first control valve fluidly connected in series with the fourth heat exchanger, and the first control valve is fluidly connected in parallel with the compressor, and the first control valve is downstream of the fourth heat exchanger, wherein the at least one controller is programmed to:

receive the high-side pressure measurement from the high-side pressure sensor;

compare the high-side pressure measurement to a maximum high-side pressure value; and command the compressor to operate at a maximum speed thereof when the low-side pressure measurement is greater than the minimum low-side pressure value and the high-side pressure measurement is less than the maximum high-side pressure value.

17. The thermal storage heat pump system of claim 16, wherein the at least one controller is programmed to command the second coolant pump to operate at a minimum speed thereof when the low-side pressure measurement is greater than the minimum low-side pressure value and the high-side pressure measurement is less than the maximum high-side pressure value, the plurality of flow control valves includes a second control valve, and the second control valve is downstream of the second heat exchanger and upstream of the first heat exchanger.

18. The thermal storage heat pump system of claim 17, wherein the at least one controller is programmed to command the first coolant to pump to remain operating at the maximum speed thereof when the low-side pressure measurement is greater than the minimum low-side pressure value and the high-side pressure measurement is less than the maximum high-side pressure value, the plurality of flow control valves includes a second flow control valve, a third flow control valve and a fourth control valve, the second flow control valve is downstream of the second heat exchanger and upstream of the first thermal expansion device, the second flow control valve is fluidly connected in series with the first thermal expansion device, the third flow control valve is fluidly connected in series with the second flow control valve, the third flow control valve is downstream of the second heat exchanger and upstream of the second flow control valve, the third flow control valve is fluidly connected in parallel with the second heat exchanger, and the third flow control valve is upstream of the third heat exchanger.

* * * * *